United States Patent [19]
Hill

[11] 3,868,664
[45] Feb. 25, 1975

[54] LIQUID LEVEL DETECTING CIRCUITS

[75] Inventor: William Frank Hill, Stafford, England

[73] Assignee: The Lucas Electrical Company, Birmingham, England

[22] Filed: June 28, 1973

[21] Appl. No.: 374,385

[30] Foreign Application Priority Data
July 1, 1972  Great Britain..................... 30918/72

[52] U.S. Cl. ......... 340/244 E, 73/304 C, 340/244 C
[51] Int. Cl. ........................................... G08b 21/00
[58] Field of Search ........ 340/244 R, 244 C, 244 E, 340/200, 235, 59; 73/304 C; 324/61 R, 61 P

[56] References Cited
UNITED STATES PATENTS
| | | | |
|---|---|---|---|
| 2,544,012 | 3/1951 | Edelman | 73/304 C |
| 2,581,085 | 1/1952 | Edelman | 73/304 C |
| 3,042,908 | 7/1962 | Pearson | 340/244 C |
| 3,254,333 | 5/1966 | Baumbel | 340/244 C |
| 3,553,575 | 1/1971 | Shea | 340/244 R |

*Primary Examiner*—John W. Caldwell
*Assistant Examiner*—Daniel Myer
*Attorney, Agent, or Firm*—Holman & Stern

[57] ABSTRACT

A liquid level detecting circuit has an amplifier with a regenerative feedback path and a degenerative feedback path. One of the paths contains a plurality of series connected probes which control whether or not the amplifier oscillates, depending on the liquid level.

1 Claim, 4 Drawing Figures

LIQUID LEVEL DETECTING CIRCUITS

This invention relates to liquid level detecting circuits particularly for use in road vehicles, for example for sensing the level of brake fluid in the reservoir.

A circuit according to the invention comprises an amplifier incorporating a regenerative path and a degenerative path, the amplifier oscillating when the degree of regeneration exceeds the degree of degeneration, probe means in one of said paths, said probe means being intended to be immersed in the liquid and controlling oscillation of the amplifier in accordance with the liquid level, and means for detecting oscillation of the amplifier.

Preferably, the probe means is in the regenerative path and the amplifier oscillates unless the liquid level falls below a predetermined level in use.

In the preferred arrangement, the probe means consists of a pair of plates constituting a capacitor the impedance of which changes substantially when the liquid falls below the predetermined level.

Figure 1:
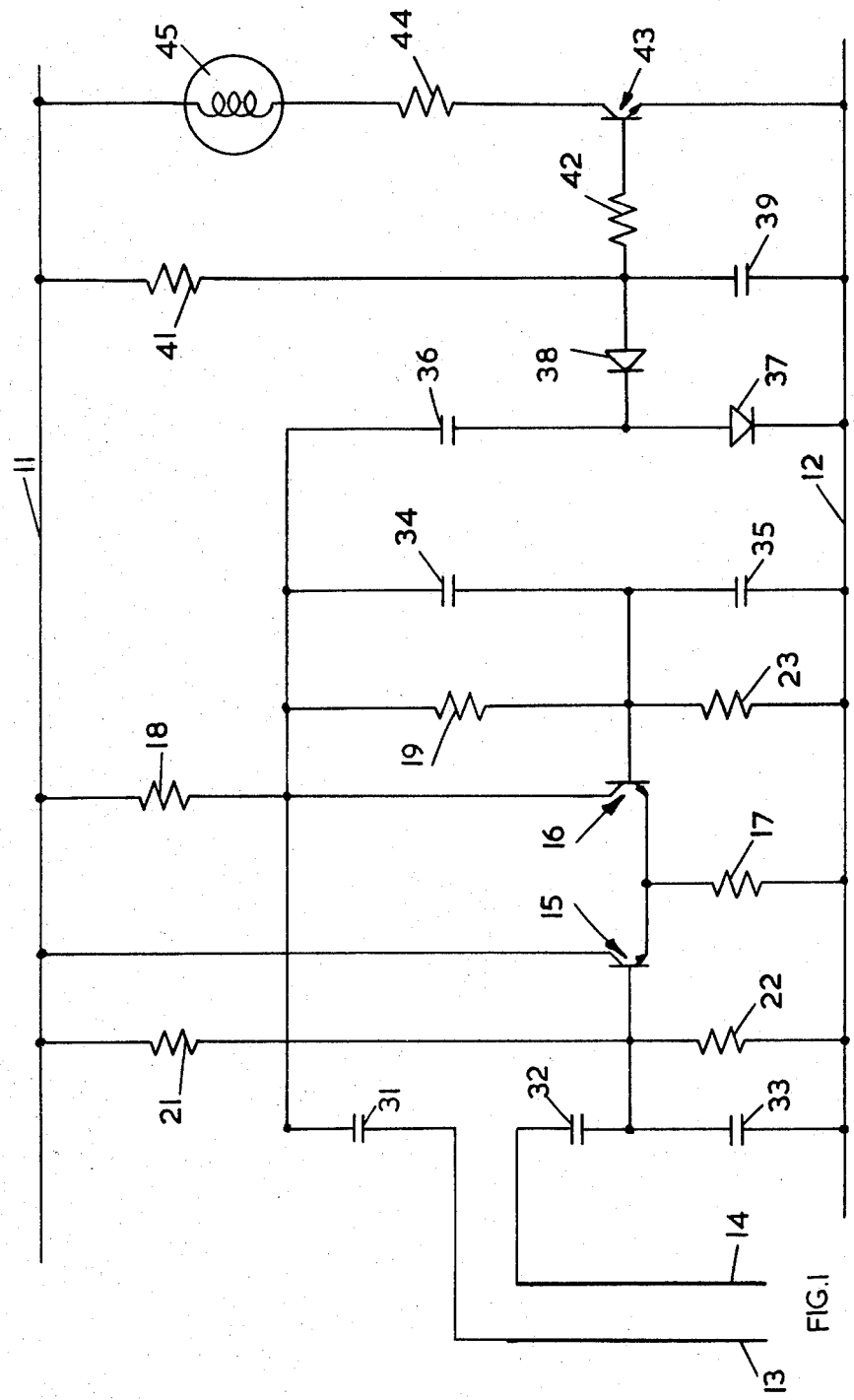
Figure 2:
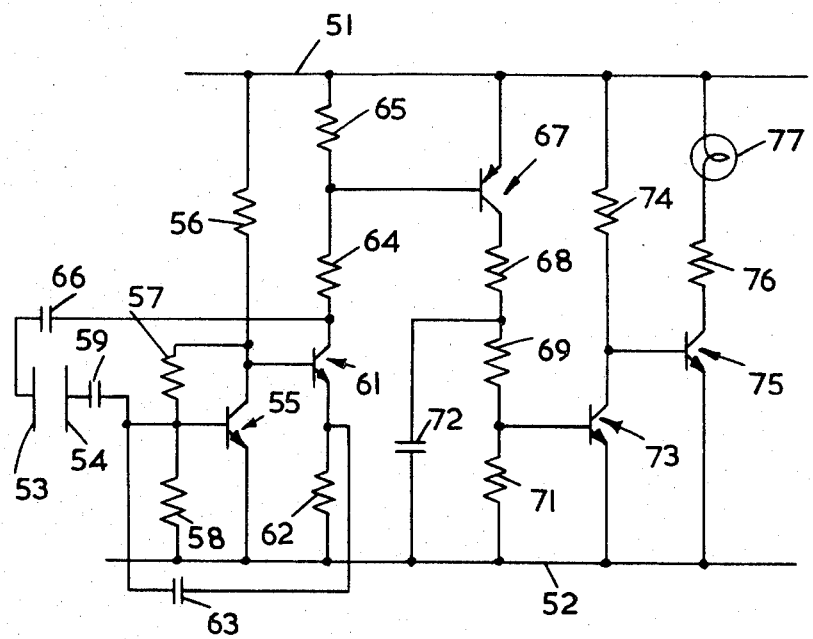
Figure 3:
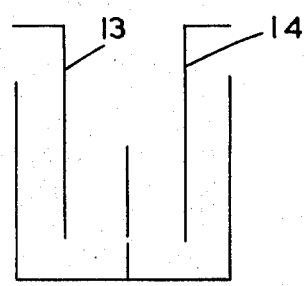
Figure 4:
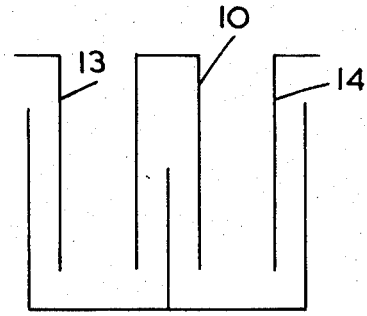

In the accompanying drawings, FIGS. 1 and 2 are circuit diagrams illustrating two examples of the invention, and FIGS. 3 and 4 illustrate two possible arrangements of the plates.

Referring to FIG. 1, there are provided positive and negative supply lines 11, 12 for connection to the battery of a vehicle. The vehicle includes a brake fluid reservoir, the liquid level within which is to be detected, and positioned within the reservoir are a pair of plates 13, 14 constituting a capacitor. The arrangement is such that provided the liquid level is above the predetermined value, the plates 13, 14 are covered by the liquid. If the liquid level falls below the predetermined value, then the plates are no longer covered.

The circuit includes an amplifier incorporating a pair of n-p-n transistors 15, 16 having their emitters interconnected and coupled to the line 12 through a resistor 17. The collector of the transistor 15 is connected to the line 11, and the collector of the transistor 16 is connected to the line 11 through a resistor 18, and is further connected to the base of the transistor 16 through a resistor 19. The base potential of the transistor 15 is set by a pair of resistors 21, 22 connected in series between the lines 11, 12, the base of the transistor 15 being connected to the junction of the resistors 21, 22. The base potential of the transistor 16 is set by the resistors 18 and 19 and a further resistor 23 connecting the base of the transistor 16 to the line 12.

The amplifier further includes a regenerative feed path consisting of a capacitor 31 coupling the collector of the transistor 16 to the probe 13, and a pair of capacitors 32, 33 connected in series between the probe 14 and the line 12, the junction of the capacitors 32 and 33 being connected to the base of the transistor 15. There is further provided a degenerative path consisting of a pair of capacitors 34, 35 coupling the collector of the transistors 16 to the line 12, the junction of the capacitors 34 and 35 being connected to the base of the transistor 16. The regenerative path acts in a manner to cause the amplifier to oscillate, because whenever the transistor 16 has an increase in collector current, the regenerative path tends to turn off the transistor 15, so that the transistor 16 conducts more. Similarly, when the transistor 16 has a reducing collector current, the regenerative feedback path tends to turn the transistor 15 on to reduce the current flow in the transistor 16 further. The degenerative feedback path, on the other hand, opposes changes in the collector current of the transistor 16, and the arrangement is such that the amplifier oscillates when the regenerative signal exceeds the degenerative signal sufficiently. The magnitude of the regenerative signal depends on the impedance of the capacitor constituted by the probes 13, 14, and the arrangement is such that provided the liquid level is above the predetermined value, the amplifier oscillates. However, when the liquid level is below the predetermined value, the degenerative path prevents oscillation of the amplifier.

The circuit further includes a capacitor 36 and a diode 37 connected in series between the collector of the transistor 16 and the line 12, the junction of the capacitor 36 and diode 37 being connected to the line 12 through a diode 38 and a capacitor 39 in series. The junction of the diode 38 and capacitor 39 is connected through a resistor 41 to the line 11, and through a resistor 42 to the base of an n-p-n transistor 43 having its emitter connected to the line 12 and its collector connected through a resistor 44 and a warning lamp 45 in series to the line 11.

Whenever the amplifier is oscillating, the diode pump circuit 36, 37, 38, 39 operates to charge the capacitor 39 negatively with respect to the line 12, so holding the transistor 43 off. However, when the amplifier stops oscillating, the capacitor 39 discharges through the resistor 41, and current flowing through the resistors 41 and 42 then turns on the transistor 43 so that the warning lamp 45 is illuminated.

Where two reservoirs are being monitored, then two pairs of plates can be controlled by a common oscillator, with the two pairs of plates in series. The arrangement can then be used to detect when both reservoirs are full, by arranging that oscillations stop when either pair of electrodes is not immersed.

It is also possible that two reservoirs can be monitored by having one plate in each reservoir, the capacitor thus formed having three layers of dielectric, two of which are constituted by the liquid, and the central layer of which is constituted by the common wall of the twin reservoir, which is normally a synthetic resin.

Referring now to the example shown in FIG. 2, there are provided positive and negative supply lines 51, 52 for connection to the battery of a vehicle. The vehicle includes a brake fluid reservoir, the liquid level within which is to be detected, and positioned within the reservoir are a pair of plates, 53, 54 constituting a capacitor. The arrangement is such that provided the liquid level is above the predetermined value, the plates 53, 54 are covered by the liquid. If the liquid level falls below the predetermined value, then the plates are no longer covered.

There is further provided an n-p-n transistor 55 having its emitter connected to the line 52 and its collector connected through a resistor 56 to the line 51. The collector of the transistor 55 is further connected to the line 52 through resistors 57, 58 in series, and the junction of the resistors 57, 58 is connected through a capacitor 59 to the plate 54. A further n-p-n transistor 61 is provided with its emitter connected to the line 52 through a resistor 62, and also connected through a capacitor 63 to the base of the transistor 55. The base of the transistor 61 is connected to the collector of the transistor 55, and its collector is connected to the line 51 through resistors 64, 65 in series. The collector of the transistor 61 is also connected through a capacitor 66 to the plate 53, and the junction of the resistors 64, 65 is connected to the base of a p-n-p transistor 67, the emitter of which is connected to the line 51 and the collector of which is connected to the line 52 through resistors 68, 69, 71 in series. The junction of the resistors 68 and 69 is connected to the line 52, and the junction of the resistors 69 and 71 is connected to the base of an n-p-n transistor 73. The emitter of the transistor 73 is connected to the line 52, and its collector is connected through a resistor 74 to the line 51, and is also connected to the base of an n-p-n transistor 75, the emitter of which is connected to the line 52, and the collector of which is connected to the line 51 through a resistor 76 and a warning lamp 77 in series.

In this example, the transistors 55, 61 constitute an amplifier with a regenerative feedback path by way of the capacitor 66, the plates 53 and 54 and the capacitor 59, and a degenerative feedback path by way of the capacitor 63. If the liquid level is below the predetermined value, then the circuit oscillates. As a result, the transistor 67 is turned on and off by the oscillator, and when the transistor 67 is on, it holds the transistor 73 on and also charges the capacitor 72. When the transistor 67 is off, the capacitor 72 on the transistor 73 on, and so whenever the oscillator is operating, the transistor 73 conducts permanently. Conduction of the transistor 73 removes base drive from the transistor 75, so that the lamp 77 is off. However, if the liquid level is below the predetermined value, then the amplifier ceases to oscillator, and the transistor 67 is off. There is now no base current for the transistor 73, and so the transistor 75 is held on by current flowing through the resistor 74, and the lamp 77 is illuminated.

The arrangements described can also be used in a twin reservoir, that is to say a reservoir with two compartments which are isolated from each other but each of which contains liquid the level of which is to be monitored. Such an arrangement is shown in FIG. 3, where it will be seen that the plates 13, 14 are in the two compartments respectively. Effectively, there is a 3-layer dielectric between the plates 13, 14, the intermediate layer being the central wall of the reservoir. A warning will be given if the level in either compartment falls below a predetermined minimum. An alternative arrangement is shown in FIG. 4, in which there is an intermediate U-shaped plate 10 bridging the reservoirs. In this case the dielectric path is through the liquid in the two reservoirs and the plate 10.

I claim:

1. A liquid level detecting circuit for giving an indication when the level of liquid in either of two containers falls below a predetermined minimum, comprising a first pair of electrodes in one of said containers, a second pair of electrodes in the other of said containers, an amplifier incorporating a regenerative feedback path and a degenerative feedback path, the amplifier oscillating when the degree of regeneration exceeds the degree of degeneration, one of said feedback paths including the first pair of electrodes and the second pair of electrodes connected in series, whereby oscillation of the amplifier is controlled in accordance with the liquid level in both containers, and means for detecting oscillation of the amplifier, whereby the liquid level in both reservoirs is detected.

* * * * *